US 8,922,684 B2

(12) United States Patent
Hayashi

(10) Patent No.: US 8,922,684 B2
(45) Date of Patent: Dec. 30, 2014

(54) IMAGING DEVICE, CONTROL METHOD FOR IMAGING DEVICE, AND STORAGE MEDIUM STORING A CONTROL PROGRAM FOR IMAGING DEVICE

(71) Applicant: FUJIFILM Corporation, Tokyo (JP)

(72) Inventor: Kenkichi Hayashi, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/092,209

(22) Filed: Nov. 27, 2013

(65) Prior Publication Data

US 2014/0085504 A1 Mar. 27, 2014

Related U.S. Application Data

(63) Continuation of application No. PCT/JP2012/057384, filed on Mar. 22, 2012.

(30) Foreign Application Priority Data

Jun. 30, 2011 (JP) ................. 2011-146445

(51) Int. Cl.
*H04N 9/083* (2006.01)
*H04N 9/73* (2006.01)
(Continued)

(52) U.S. Cl.
CPC ............... *H04N 9/646* (2013.01); *H04N 9/735* (2013.01); *H04N 5/367* (2013.01); *H04N 5/217* (2013.01); *H04N 5/3572* (2013.01); *H04N 9/045* (2013.01); *H04N 9/07* (2013.01)
USPC ........................................................ 348/280

(58) Field of Classification Search
CPC ................. H01L 27/14621; H01L 27/14603; H01L 27/14645; H01L 31/02162; H04N 2209/045; H04N 5/2254; H04N 9/646; H04N 9/73; H06T 2207/10024
USPC ......................................... 348/272, 273, 280
See application file for complete search history.

(56) References Cited

U.S. PATENT DOCUMENTS 6,995,796 B2 2/2006 Taubman
7,692,699 B2 * 4/2010 Kobayashi .................... 348/244
(Continued)

FOREIGN PATENT DOCUMENTS

EP 2 299 721 A1 3/2011
JP 8-23542 A 1/1996
(Continued)

OTHER PUBLICATIONS

Li et al, "Color Filter Arrays: A Design Methodology", May 2008, Queen Mary University of London, RR-08-03, pp. 1-3.*

(Continued)

*Primary Examiner* — Sinh Tran
*Assistant Examiner* — Mark Monk
(74) *Attorney, Agent, or Firm* — Birch, Stewart, Kolasch & Birch, LLP

(57) ABSTRACT

A deterioration in image quality caused by correction can be prevented in comparison to when consideration is not given to the sequence in which correction is performed on an image captured by an image pickup device. An imaging apparatus 10 is configured including an optical system 12, an image pickup device 14, an image capture correction processing section 16, and an image processing section 18. The image capture correction processing section 16 is configured including a color mixing correction section 20, a noise correction section 22, an offset correction section 24 and a gain correction section 26. The color mixing correction section 20 reads image data from the image pickup device 14 and performs color mixing correction processing thereon. The noise correction section 22 performs noise correction processing on the image data on which the color mixing correction section 20 has performed color mixing correction processing.

14 Claims, 18 Drawing Sheets

(51) Int. Cl.
*H04N 5/217* (2011.01)
*H04N 5/357* (2011.01)
*H04N 9/04* (2006.01)
*H04N 9/64* (2006.01)
*H04N 9/07* (2006.01)
*H04N 5/367* (2011.01)

(56) References Cited

U.S. PATENT DOCUMENTS

| | | | |
|---|---|---|---|
| 2002/0149686 | A1 | 10/2002 | Taubman |
| 2004/0109068 | A1 | 6/2004 | Mitsunaga et al. |
| 2004/0169747 | A1 | 9/2004 | Ono et al. |
| 2006/0017824 | A1 | 1/2006 | Kohashi |
| 2006/0203113 | A1 | 9/2006 | Wada et al. |
| 2007/0153104 | A1 | 7/2007 | Ellis-Monaghan et al. |
| 2008/0131028 | A1 | 6/2008 | Pillman et al. |
| 2008/0151083 | A1 | 6/2008 | Hains et al. |
| 2008/0225135 | A1 | 9/2008 | Mizukura et al. |
| 2009/0122165 | A1* | 5/2009 | Kinoshita ............ 348/241 |
| 2009/0213251 | A1 | 8/2009 | Mizukura et al. |
| 2011/0069189 | A1 | 3/2011 | Venkataraman et al. |
| 2011/0102635 | A1 | 5/2011 | Fukunaga et al. |
| 2012/0025060 | A1 | 2/2012 | Iwata |

FOREIGN PATENT DOCUMENTS

| | | |
|---|---|---|
| JP | 8-23543 A | 1/1996 |
| JP | 11-285012 A | 10/1999 |
| JP | 2000-308080 A | 11/2000 |
| JP | 2004-221839 A | 8/2004 |
| JP | 2004-266369 A | 9/2004 |
| JP | 2005-136766 A | 5/2005 |
| JP | 2006-41687 A | 2/2006 |
| JP | 2006-109046 A | 4/2006 |
| JP | 2006-211478 A | 8/2006 |
| JP | 2007-110486 A | 4/2007 |
| JP | 2007-184904 A | 7/2007 |
| JP | 2007-306490 A | 11/2007 |
| JP | 2008-236620 A | 10/2008 |
| JP | 2009-105488 A | 5/2009 |
| JP | 2010-016419 A | 1/2010 |
| JP | 2010-512048 A | 4/2010 |
| JP | 2010-153511 A | 7/2010 |
| JP | 2010-258620 A | 11/2010 |
| JP | 2011-523538 A | 8/2011 |
| WO | 02/056604 A1 | 7/2002 |
| WO | WO 2008/066698 A2 | 6/2008 |
| WO | WO 2009/151903 A2 | 12/2009 |

OTHER PUBLICATIONS

International Preliminary Report on Patentability issued in International Application No. PCT/JP2012/057384 on Mar. 5, 2013.
International Search Report issued in International Application No. PCT/JP2012/057384 on May 29, 2012.
Office Action issued in Chinese Patent Application No. 201180022503.3 on May 23, 2013.
PCT/ISA/237—issued in International Application No. PCT/JP2012/057384 on May 29, 2012.
Written Opinion of the ISA issued in International Application No. PCT/JP2012/080898 on Jan. 22, 2013.
Written Opinion of the ISA issued in International Application No. PCT/JP2012/080899 on Jan. 15, 2013.
Written Opinion of the ISA issued in International Application No. PCT/JP2012/081644 on Jan. 15, 2013.
Written Opinion of the ISA issued in International Application No. PCT/JP2012/083583 on Jan. 29, 2013.
Chinese Office Action mailed Jun. 30, 2014 in corresponding Chinese Application No. 201280026603.8.
European Search Report mailed Jun. 16, 2014 for related Application No. EP 12805328.7.

* cited by examiner

A ARRAY    B ARRAY

| B | G | B | R | G | R | B | G | B | R | G | R |
|---|---|---|---|---|---|---|---|---|---|---|---|
| G | R | G | G | B | G | G | R | G | G | B | G |
| B | G | B | R | G | R | B | G | B | R | G | R |
| R | G | R | B | G | B | R | G | R | B | G | B |
| G | B | G | G | R | G | G | B | G | G | R | G |
| R | G | R | B | G | B | R | G | R | B | G | B |
| B | G | B | R | G | R | B | G | B | R | G | R |
| G | R | G | G | B | G | G | R | G | G | B | G |
| B | G | B | R | G | R | B | G | B | R | G | R |
| R | G | R | B | G | B | R | G | R | B | G | B |
| G | B | G | G | R | G | G | B | G | G | R | G |
| R | G | R | B | G | B | R | G | R | B | G | B |

FIG.6

| G | R | B | G | G | R | B | G |
|---|---|---|---|---|---|---|---|
| B | G | G | R | B | G | G | R |
| R | G | G | B | R | G | G | B |
| G | B | R | G | G | B | R | G |
| G | R | B | G | G | R | B | G |
| B | G | G | R | B | G | G | R |
| R | G | G | B | R | G | G | B |
| G | B | R | G | G | B | R | G |

FIG.7

| G | G | G | R | B | G | G | G | R | B |
|---|---|---|---|---|---|---|---|---|---|
| B | G | R | G | G | B | G | R | G | G |
| R | B | G | R | B | R | B | G | R | B |
| G | G | B | G | R | G | G | B | G | R |
| B | R | G | G | G | B | R | G | G | G |
| G | G | G | R | B | G | G | G | R | B |
| B | G | R | G | G | B | G | R | G | G |
| R | B | G | R | B | R | B | G | R | B |
| G | G | B | G | R | G | G | B | G | R |
| B | R | G | G | G | B | R | G | G | G |

FIG.8

| G | R | B | G | R | B | G | G | R | B | G | R | B | G |
|---|---|---|---|---|---|---|---|---|---|---|---|---|---|
| R | G | G | B | G | G | R | R | G | G | B | G | G | R |
| B | G | G | R | G | G | B | B | G | G | R | G | G | B |
| G | R | B | G | B | R | G | G | R | B | G | B | R | G |
| B | G | G | R | G | G | B | B | G | G | R | G | G | B |
| R | G | G | B | G | G | R | R | G | G | B | G | G | R |
| G | B | R | G | B | R | G | G | B | R | G | B | R | G |
| G | R | B | G | R | B | G | G | R | B | G | R | B | G |
| R | G | G | B | G | G | R | R | G | G | B | G | G | R |
| B | G | G | R | G | G | B | B | G | G | R | G | G | B |
| G | R | B | G | B | R | G | G | R | B | G | B | R | G |
| B | G | G | R | G | G | B | B | G | G | R | G | G | B |
| R | G | G | B | G | G | R | R | G | G | B | G | G | R |
| G | B | R | G | B | R | G | G | B | R | G | B | R | G |

FIG.9

| R | B | G | R | B | R | G | B | R | B | G | R | B | R | G | B |
|---|---|---|---|---|---|---|---|---|---|---|---|---|---|---|---|
| G | G | G | B | G | G | G | R | G | G | G | B | G | G | G | R |
| B | G | G | G | R | G | G | G | B | G | G | G | R | G | G | G |
| R | G | B | R | B | G | R | B | R | G | B | R | B | G | R | B |
| B | R | G | B | R | B | G | R | B | R | G | B | R | B | G | R |
| G | G | G | R | G | G | G | B | G | G | G | R | G | G | G | B |
| R | G | G | G | B | G | G | G | R | G | G | G | B | G | G | G |
| B | G | R | B | R | G | B | R | B | G | R | B | R | G | B | R |
| R | B | G | R | B | R | G | B | R | B | G | R | B | R | G | B |
| G | G | G | B | G | G | G | R | G | G | G | B | G | G | G | R |
| B | G | G | G | R | G | G | G | B | G | G | G | R | G | G | G |
| R | G | B | R | B | G | R | B | R | G | B | R | B | G | R | B |
| B | R | G | B | R | B | G | R | B | R | G | B | R | B | G | R |
| G | G | G | R | G | G | G | B | G | G | G | R | G | G | G | B |
| R | G | G | G | B | G | G | G | R | G | G | G | B | G | G | G |
| B | G | R | B | R | G | B | R | B | G | R | B | R | G | B | R |

FIG.17

|   |   |   |   |   |   |   |   |   |
|---|---|---|---|---|---|---|---|---|
| G | B | G | G | R | G | G | B | G |
| R | G | R | B | G | B | R | G | R |
| G | B | G | G | R | G | G | B | G |
| G | R | G | G | B | G | G | R | G |
| B | G | B | R | G | R | B | G | B |
| G | R | G | G | B | G | G | R | G |
| G | B | G | G | R | G | G | B | G |
| R | G | R | B | G | B | R | G | R |
| G | B | G | G | R | G | G | B | G |

A ARRAY    B ARRAY

IMAGING DEVICE, CONTROL METHOD FOR IMAGING DEVICE, AND STORAGE MEDIUM STORING A CONTROL PROGRAM FOR IMAGING DEVICE

CROSS-REFERENCE TO RELATED APPLICATIONS

This application is a continuation application of International Application No. PCT/JP2012/057384, filed Mar. 22, 2012, the disclosure of which is incorporated herein by reference in its entirety. Further, this application claims priority from Japanese Patent Application No. 2011-146445, filed Jun. 30, 2011.

BACKGROUND

1. Technical Field

The present invention relates to an imaging apparatus, an image capture method, and an image capture program, and in particular relates to an image processing apparatus, imaging apparatus, an imaging apparatus control method, and an imaging apparatus control program that perform color mixing correction.

2. Related Art

Processing is normally performed on image capture signals captured by an image pickup device to improve and correct deterioration in image quality caused by for example characteristics of the image pickup device (see for example Patent Documents 1 to 5). There are various types of correction processing, and it is important to consider the effects of performing each correction processing and configure the optimum processing sequence.

For example Patent Document 1 discloses technology wherein pixel defect correction is performed prior to color mixing correction.

Patent Document 2 discloses technology wherein black level correction is performed prior to color mixing correction.

Patent Document 3 discloses technology wherein black level correction is performed after noise reduction processing.

Patent Document 4 discloses technology wherein noise reduction processing is performed after black level correction.

Moreover, a relationship between offset correction and gain correction is such that gain correction is preferably performed after offset correction. This is since gain correction (for example sensitivity correction, white balance correction, shading correction) is processing that corrects gain of the pixel itself, and therefore an offset amount of the image capture signal changes depending on the gain correction amount when gain correction is performed prior to offset correction.

Moreover, a relationship between offset correction and noise correction is such that offset correction is preferably performed after noise correction. This is since noise correction is processing to reduce (suppress) noise, and therefore noise characteristics on the low brightness side are affected by offset correction, such that appropriate noise reduction processing cannot be performed when noise correction is performed after offset correction.

Color mixing correction is important in cases in which a color image pickup device is provided with a color filter. The color filter is configured by a repeatedly disposed predetermined basic array pattern, however when employing a color filter with a basic array pattern size larger than that of a conventional Bayer array, processing such as color mixing correction and pixel defect correction becomes particularly important.

PATENT DOCUMENTS

Patent Document 1: Japanese Patent Application Laid-Open (JP-A) No. 2010-258620
Patent Document 2: JP-A No. 2010-16419
Patent Document 3: JP-A No. 2007-110486
Patent Document 4: JP-A No. 2006-41687

However, in the conventional technology mentioned above, there is an issue in that no particular consideration has been given to the relationship between, for example, color mixing correction and noise correction, and there is a possibility of being unable to perform appropriate correction of images captured by the image pickup device.

SUMMARY

In order to address the above issues, an object of the present invention is to provide an imaging apparatus, an image apparatus control method, and an imaging apparatus control program capable of preventing a deterioration in image quality caused by correction in comparison to cases in which consideration is not given to the sequence in which correction is performed on an image captured by an image pickup device.

In order to address the above issues, an imaging apparatus of the present invention includes: an image pickup device including plural photoelectric conversion elements arrayed in a horizontal direction and a vertical direction; a color filter that is provided above plural pixels configured by the plural photoelectric conversion elements, the color filter having repeatedly disposed basic array patterns of plural filters respectively corresponding to plural different colors that are placed in a predetermined pattern in the horizontal direction and the vertical direction; a color mixing correction section that performs color mixing correction on image data of an image captured by the image pickup device; and a noise correction section that performs noise correction processing on the image data that has been color mixing corrected by the color mixing correction section.

According to the present invention, a level difference between adjacent pixels that is necessary in color mixing correction can be prevented from being lost, and appropriate color mixing correction can be performed, due making configuration such that the noise correction section is provided at a stage subsequent to the color mixing correction section.

Note that configuration may be made further including: an offset correction section that performs offset correction on the image data prior to the color mixing correction; and a reverse offset correction section that performs reverse offset correction on the image data after the color mixing correction and prior to the noise correction processing.

According to the present invention, appropriate color mixing correction can be performed without being affected by offset due to performing offset correction prior to the color mixing correction, and performing reverse offset correction after the color mixing correction and prior to the noise correction processing.

Moreover, configuration may be made wherein: the offset correction section assigns negative values to pixel values that become less than zero when an offset value has been subtracted from each pixel value of the image data.

According to the present invention, adverse effects on for example later noise correction processing can be prevented since even when pixel data becomes a negative value, the negative value is not clipped at zero, and the negative value is assigned as it is.

Moreover, configuration may be made further including: a pixel defect correction section that performs pixel defect correction prior to the color mixing correction.

According to the present invention, appropriate color mixing correction can be performed in a pixel defect corrected state, and a drop in image quality can be prevented, due to performing the pixel defect correction prior to the color mixing correction.

Note that configuration may be made wherein: in the color filter the basic array pattern is disposed with a first filter corresponding to a first color that contributes most to obtaining a brightness signal and second filters respectively corresponding to 2 or more second colors other than the first color, and the basic array pattern is disposed repeating in the horizontal direction and the vertical direction; and the first filter is moreover placed such that in the basic array pattern there are portions where there are 2 or more of the first filters adjacent to each other in the horizontal direction, the vertical direction and the diagonal directions.

According to the present invention, the first filter corresponding to the first color that contributes most to obtaining a brightness signal is placed such that in the basic array pattern there are portions where there are 2 or more of the first filters adjacent to each other in the horizontal direction, the vertical direction and the diagonal directions. Accordingly, the direction out of the 4 directions above that is a brightness correlation direction can be determined using the smallest pixel separation based on difference values between the pixel values of the adjacent first color pixels in each of the directions. Accordingly, when computing other color pixel values at pixel positions of pixels subject to synchronization processing extracted from a mosaic image output from a color image pickup device, the pixel values of the other color pixels can be estimated with good precision by employing the pixel values of the other color pixels present in the correlation direction according to the brightness correlation direction determined using the smallest pixel separation pixel values as described above, thereby enabling the occurrence of false color in high frequency portions to be suppressed.

Moreover configuration may be made wherein one or more of the first filter and one or more of each of the second filters respectively corresponding to the second colors are respectively placed in each horizontal direction line and each vertical direction line of the color filter inside the basic array pattern.

Moreover, configuration may be made wherein: the basic array pattern is a square array pattern corresponding to N×N pixels, wherein N is an integer of 4 or above.

Moreover, configuration may be made wherein: the color filter contains a square array corresponding to 2×2 pixels configured by the first filter.

Moreover, configuration may be made wherein: the first color is green (G), and the second colors are red (R) and blue (B).

Moreover, configuration may be made wherein: the color filter includes a R filter, a G filter and a B filter corresponding respectively to the colors red (R), green (G), and blue (B); and the color filter is configured by a first array and a second array alternately arrayed in the horizontal direction and the vertical direction, wherein the first array corresponds to 3×3 pixels with the R filter placed at the center, the B filter placed at the 4 corners, and the G filter placed at the top, bottom, left and right of the central R filter, and the second array corresponds to 3×3 pixels with the B filter placed at the center, the R filter placed at the 4 corners, and the G filter placed at the top, bottom, left and right of the central B filter.

According to the present invention, when 5×5 pixels (a local region of a mosaic image) centered on the first array or the second array are considered in isolation, mutually adjacent G pixels are present on each of both sides of the central pixel (R pixel or B pixel) of the 5×5 pixels in the horizontal direction and the vertical direction respectively. Pixel values of these G pixels (8 pixels in total) can be employed to determine the correlation direction out of 4 directions.

Moreover, configuration may be made wherein: the color filter includes a R filter, a G filter and a B filter corresponding respectively to the colors red (R), green (G), and blue (B); and the color filter is configured by a first array and a second array alternately arrayed in the horizontal direction and the vertical direction, wherein the first array corresponds to 3×3 pixels with the G filter placed at the center and at the 4 corners, the B filter placed at the top and bottom of the central G filter, and the R filter placed at the left and right of the central G filter, and the second array corresponds to 3×3 pixels with the G filter placed at the center and at the 4 corners, the R filter placed at the top and bottom of the central G filter, and the B filter placed at the left and right of the central G filter.

According to the present invention, when 5×5 pixels (a local region of a mosaic image) centered on the first array or the second array are considered in isolation, 2×2 G pixels are present in the 4 corners of the of the 5×5 pixels. The pixel values of these 2×2 G pixels can be employed to determine the correlation direction from out of 4 directions.

Moreover, configuration may be made wherein: in the color filter, the first filter is respectively placed contiguously in the horizontal direction and the vertical direction on both sides of the filter of any one color out of the second filters.

According to the present invention, the direction out of the 4 directions above that is the brightness correlation direction can be determined using the smallest pixel separation based on difference values between the pixel values of the contiguous pixels corresponding to the first filter.

Moreover, configuration may be made wherein: the color filter has point symmetry about the center of the basic array pattern.

According to the present invention, the circuit scale of a later stage processing circuit can be made smaller.

An imaging apparatus control method of the present invention is an image capture method executed by an imaging apparatus including: an image pickup device including plural photoelectric conversion elements arrayed in a horizontal direction and a vertical direction, and a color filter that is provided above plural pixels configured by the plural photoelectric conversion elements, the color filter having repeatedly disposed basic array patterns of plural filters respectively corresponding to plural different colors that are placed in a predetermined pattern in the horizontal direction and the vertical direction, the imaging method including: performing color mixing correction on image data of an image captured by the image pickup device; and performing noise correction processing on the image data that has been color mixing corrected.

An imaging apparatus control program of the present invention causes a computer that controls an imaging apparatus including: an image pickup device including plural photoelectric conversion elements arrayed in a horizontal direction and a vertical direction, and a color filter that is provided above plural pixels configured by the plural photoelectric conversion elements, the color filter having repeatedly disposed basic array patterns of plural filters respectively corresponding to plural different colors that are placed in a predetermined pattern in the horizontal direction and the vertical direction, to function as: a color mixing correction section that performs color mixing correction on image data of an image captured by the image pickup device; and a noise correction section that performs noise correction processing on the image data that has been color mixing corrected by the color mixing correction section.

Advantageous Effects of Invention

The present invention exhibits the advantageous effect of enabling correction processing to be performed on an image captured by the image pickup device in an appropriate sequence.

BRIEF DESCRIPTION OF DRAWINGS

FIG. 6 is a diagram illustrating a modified example of a color filter.

FIG. 7 is a diagram illustrating a modified example of a color filter.

FIG. 8 is a diagram illustrating a modified example of a color filter.

FIG. 9 is a diagram illustrating a modified example of a color filter.

FIG. 17 is a diagram illustrating a color filter in which 6×6 pixel basic array patterns contained in a color filter according to the fourth exemplary embodiment are split into 3×3 pixel A arrays and B arrays that are repeatedly disposed along a horizontal direction and a vertical direction.

DESCRIPTION OF EMBODIMENTS

Explanation follows regarding exemplary embodiments of the present invention, with reference to the drawings.

First Exemplary Embodiment

Figure 1:
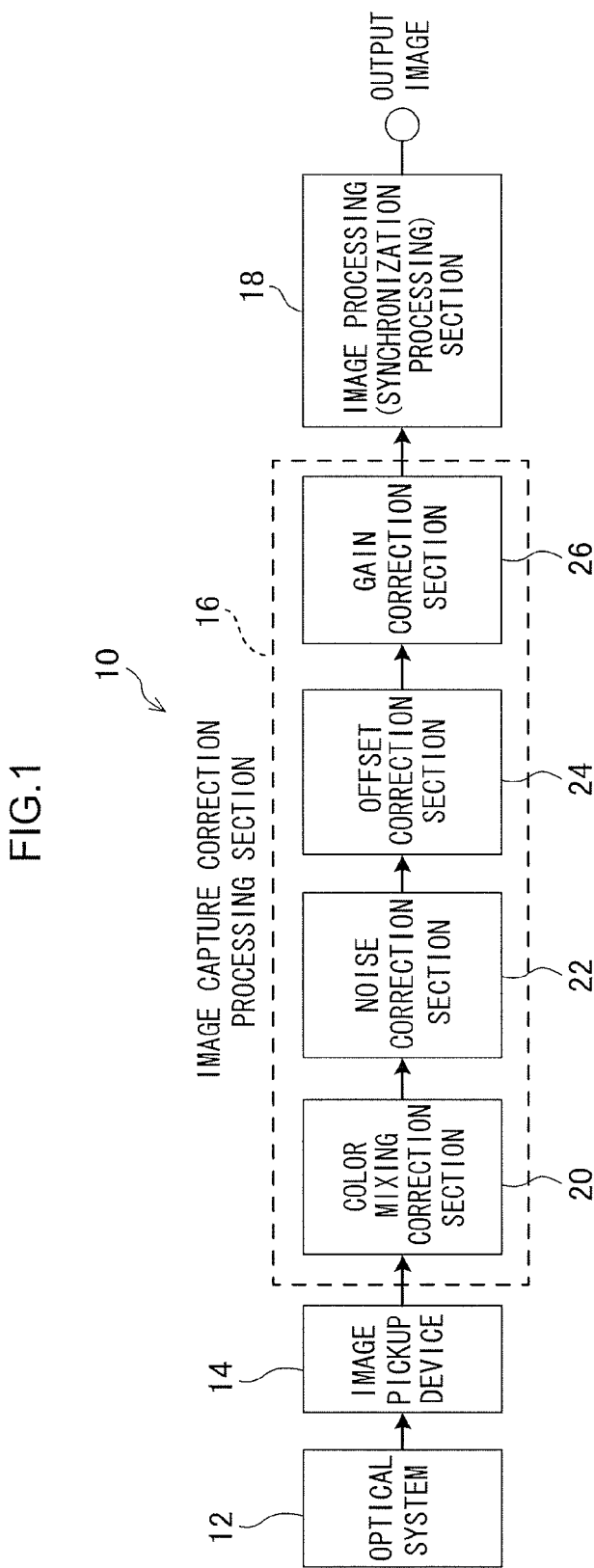
FIG. 1 is a schematic block diagram of an imaging apparatus according to a first exemplary embodiment.

FIG. 1 is a schematic block diagram illustrating an imaging apparatus 10 according to the present exemplary embodiment. The imaging apparatus 10 is configured including an optical system 12, an image pickup device 14, an image capture correction processing section 16, and an image processing section 18.

The optical system 12 is configured including for example a lens set configured from plural optical lenses, an aperture adjustment mechanism, a zoom mechanism, and an automatic focusing mechanism.

The image pickup device 14 is what is referred to as a 1-chip image pickup device configured by an image pickup device, such as for example a Charge Coupled Device (CCD) or a Complementary Metal Oxide Semiconductor (CMOS) containing plural photoelectric conversion elements arrayed in the horizontal direction and vertical direction, with a color filter disposed above the image pickup device.

Figure 2:
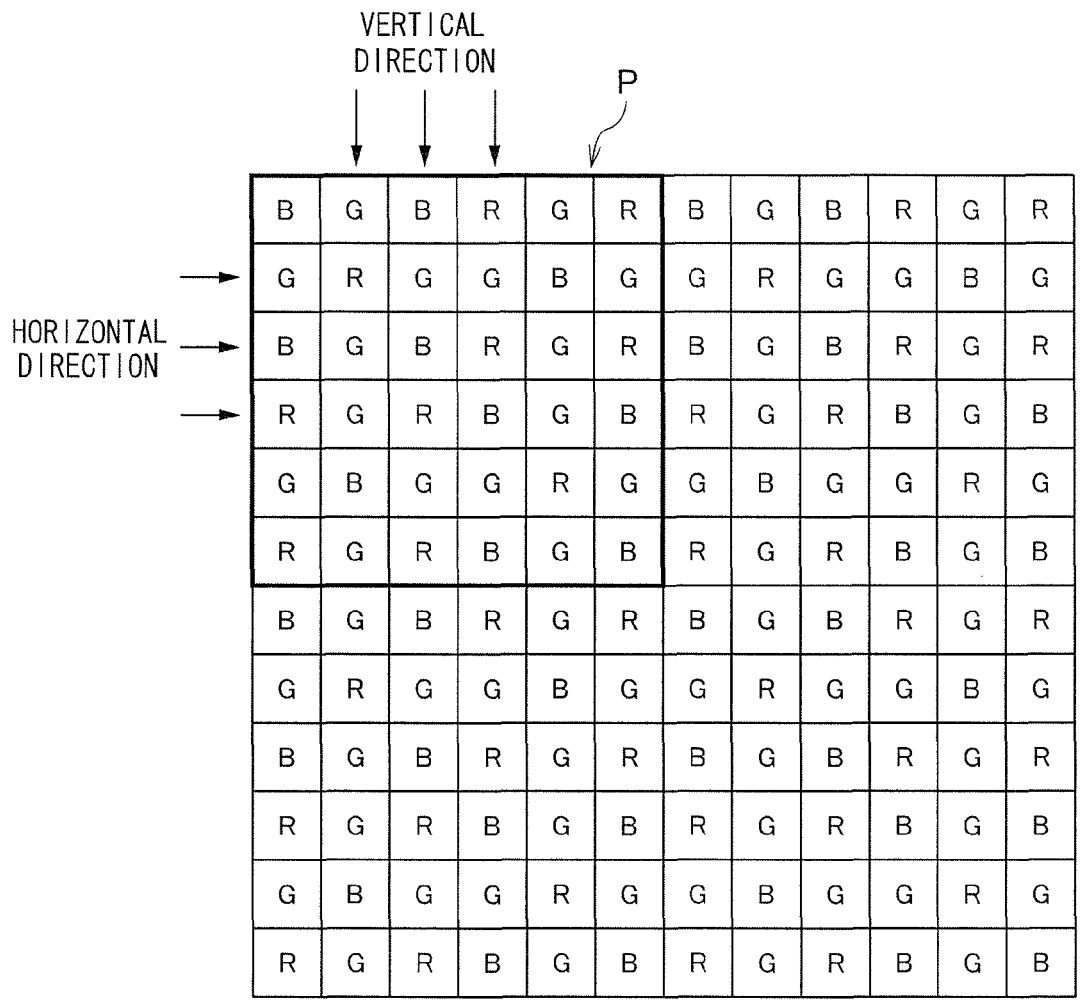
FIG. 2 is a configuration diagram of a color filter according to the first exemplary embodiment.

FIG. 2 illustrates a portion of a color filter according to the present exemplary embodiment. One out of 3 primary color filters red (R), green (G) and blue (B) is placed over each of the pixels.

Color Filter Array Features

The color filter of the first exemplary embodiment includes the following features (1), (2), (3) and (4).

Feature (1)

The color filter illustrated in FIG. 2 includes a basic array pattern P (the pattern indicated by the bold frame) formed from square array patterns corresponding to 6×6 pixels, with the basic array pattern P disposed so as to repeat in both the horizontal direction and the vertical direction. Namely, the color filter is arrayed such that the respective filters of each color R, G, B (the R filters, G filters, B filters) have a specific periodicity.

Thus arraying the R filters, G filters and B filters with a specific periodicity enables processing to be performed in a repeating pattern during for example synchronization (interpolation) processing (also referred to as mosaic processing) of R, G, B signals read from the color image pickup device.

Moreover, when images are reduced by thinning processing in basic array pattern P units, the color filter array of the thinning processed reduced image can be made similar to the color filter array prior to thinning processing, enabling a common processing circuit to be employed.

Feature (2)

The basic array pattern P configuring the color filter illustrated in FIG. 2 has one or more of the G filter, that corresponds to the color contributing the most to obtaining a brightness signal (the color G in the present exemplary embodiment), and one or more of the R filters and the B filters that correspond to the colors other than G (R, B in the present exemplary embodiment) placed in each line in the horizontal direction and vertical direction inside the basic array pattern.

The R, G, and B filters are respectively placed in each line in the horizontal direction and vertical direction in the basic array pattern P, thereby enabling color moire (false color) generation to be suppressed.

Feature (3)

The G filters that correspond to brightness system pixels are placed inside the basic array pattern P such that the basic array pattern P contains portions where there are 2 or more of the G filters adjacent to each other in each direction of the horizontal direction, vertical direction and the diagonal directions (NE, NW).

Figure 3:
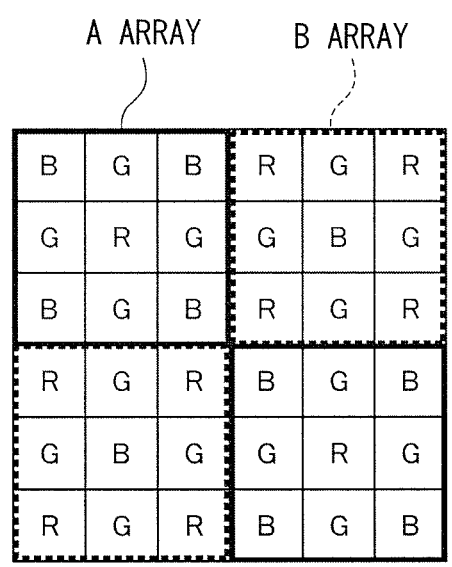
FIG. 3 is a diagram illustrating a basic array pattern contained in a color filter according to the first exemplary embodiment.

FIG. 3 illustrates the basic array pattern P illustrated in FIG. 2 in a state split into 4 groups of 3×3 pixels.

As illustrated in FIG. 3, the basic array pattern P may also be considered an array in which an A array of the 3×3 pixels surrounded by the solid line frame and a B array of the 3×3 pixels surrounded by the broken line frame are arranged alternately along the horizontal direction and the vertical direction.

In the A array the R filter is placed at the center, the B filters are placed at the 4 corners, and the G filters are placed on each side of the central R filter to the top and bottom and left and right. In the B array, the B filter is placed at the center, the R filters are placed at the 4 corners, and the G filters are placed on each side of the central B filter to the top and bottom and left and right. The A array and the B array have reverse positional relationships for the R filters and the B filters, but have the same placement otherwise.

Figures 4A, 4B:
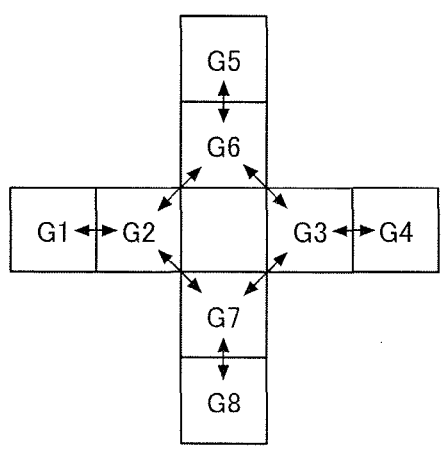
FIG. 4A is a diagram illustrating a color filter in which 6×6 pixel basic array patterns contained in a color filter according to the first exemplary embodiment are split into 3×3 pixel A arrays and B arrays that are repeatedly disposed along a horizontal direction and a vertical direction.
FIG. 4B is a diagram illustrating a distinctive placement of G pixels in the color filter of FIG. 4A.

As illustrated in FIG. 4A, the color filter of the first exemplary embodiment may also be considered a repeating array of the basic array pattern P in which the A array and the B array are alternately disposed in the horizontal direction and the vertical direction.

When, as illustrated in FIG. 4A, in a mosaic image output from the image pickup device 14, a 5×5 pixel local region (the region illustrated by the bold frame) centered on the A array is considered in isolation, 8 individual G pixels in this local region are placed in a cross shape as illustrated in FIG. 4B. Taking these G pixels as G1, G2, G3, G4 in sequence from left to right, and as G5, G6, G7, G8 in sequence from top to bottom, then the pixels G1, G2 and the pixels G3, G4 are respectively adjacent to each other in the horizontal direction, the pixels G5, G6 and the pixels G7, G8 are respectively adjacent to each other in the vertical direction, the pixels G6, G3 and the pixels G2, G7 are respectively adjacent to each other in the top left to bottom right diagonal direction, and the pixels G6, G2 and the pixels G3, G7 are respectively adjacent to each other in the bottom left to top right diagonal direction.

Consequently, by deriving difference absolute values between the pixel values of these adjacent pixels, the direction out of each of the horizontal, vertical and diagonal (NE, NW) directions having the smallest change in brightness (a correlation direction with high correlation) can be determined using the smallest pixel separation.

Namely, the sum of the difference absolute values in the horizontal direction is |G1−G2|+|G3−G4|, the sum of the difference absolute values in the vertical direction is |G5−G6|+|G7−G8|, the sum of the difference absolute values in the bottom left to top right diagonal direction is |G6−G2|+|G3−G7|, and the sum of the difference absolute values in the top left to bottom right diagonal direction is |G6−G3|+|G2−G7|.

The correlation (correlation direction) can then be determined as the direction with the smallest difference absolute value out of these four correlation absolute values. Note that the determined correlation direction can be employed during the performance of processing such as synchronization (interpolation) by the image processing section 18.

Feature (4)

The basic array pattern P configuring the color filter illustrated in FIG. 2 has point symmetry around the center of the basic array pattern P.

As illustrated in FIG. 3, the A arrays and the B arrays in the basic array pattern are configured with point symmetry about the central R filter or B filter respectively, and also with symmetry (line symmetry) in the up-down and left-right directions.

Figure 5:
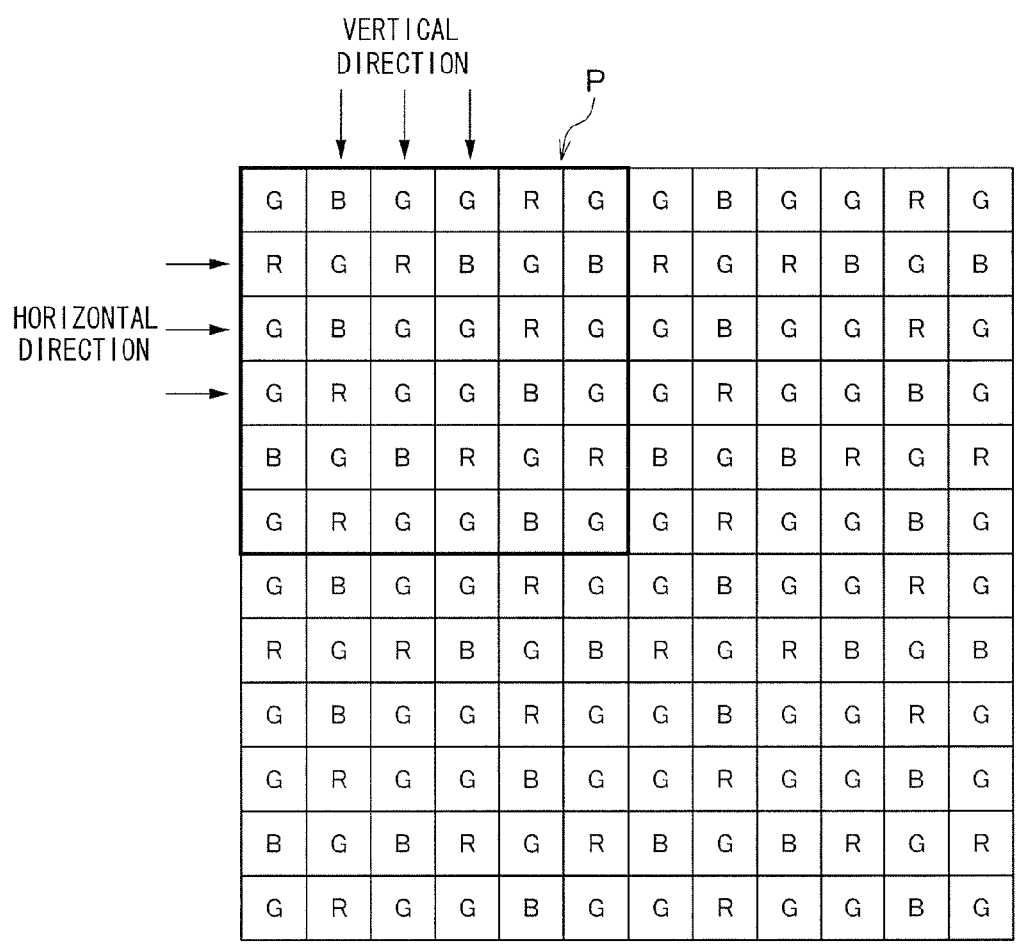
FIG. 5 is a diagram illustrating a modified example of a color filter.

Such symmetry enables the circuit scale of a later stage processing circuit to be made smaller and to be simplified. Note that there is no limitation of the color filter to the configuration illustrated in FIG. 2, and configuration may be made for example employing a color filter with repeatedly disposed basic array patterns in the horizontal direction and the vertical direction including a basic array pattern configured from a square array pattern corresponding to 6×6 pixels as illustrated in FIG. 5 (the pattern indicated by the bold frame) (described in detail later), a color filter with repeatedly disposed basic array patterns in the horizontal direction and the vertical direction including a basic array pattern configured from a square array pattern corresponding to 4×4 pixels as illustrated in FIG. 6 (the pattern indicated by the bold frame), a color filter with repeatedly disposed basic array patterns in the horizontal direction and the vertical direction including a basic array pattern configured from a square array pattern corresponding to 5×5 pixels as illustrated in FIG. 7 (the pattern indicated by the bold frame), a color filter with repeatedly disposed basic array patterns in the horizontal direction and the vertical direction including a basic array pattern configured from a square array pattern corresponding to 7×7 pixels as illustrated in FIG. 8 (the pattern indicated by the bold frame), or by a color filter with repeatedly disposed basic array patterns in the horizontal direction and the vertical direction including a basic array pattern configured from a square array pattern corresponding to 8×8 pixels as illustrated in FIG. 9 (the pattern indicated by the bold frame). Moreover, the basic array pattern is not limited to an N×N (where N is a positive integer of 2 or above) square array as described above, and configuration may be made with an N×M array (where N and M are positive integers of 2 or above). However, N and M are preferably 10 or below in consideration of ease of image processing such as thinning processing performed during synchronization processing and video capture processing.

The image capture processing section 16 is configured including a color mixing correction section 20, a noise correction section 22, an offset correction section 24 and a gain correction section 26.

The color mixing correction section 20 performs color mixing correction on for example pixel data of each pixel. The color mixing correction may employ various known color mixing processing, and is processing to correct the effects of color mixing on pixel values of pixels of interest out of pixel data of each pixel by, for example, multiplying by a coefficient expressing the extent of color mixing influence from pixels present at the periphery of the pixel of interest.

The noise correction section 22 performs noise correction processing on pixel data of each pixel. The noise correction may employ various known noise correction processing, and is processing to remove for example a random noise component.

The offset correction section 24 performs offset correction processing on pixel data of each pixel. The offset correction may employ various known offset correction processing, and is processing to correct (reduce) a fixed offset component such as a dark current component.

The gain correction section 26 performs gain correction processing on pixel data of each pixel. The gain correction processing may employ various known gain correction, and is for example processing such as sensitivity correction, white balance correction, and shading correction.

Note that since noise correction is processing to reduce (suppress) noise, sometimes level difference between adjacent pixels, that is necessary in color mixing correction, is lost prior to performing color mixing correction. Since there is accordingly a concern of not being able to perform appropriate color mixing correction when color mixing correction is performed after noise correction, in the present exemplary embodiment configuration is made such that the noise correction section 22 is provided at a stage subsequent to the color mixing correction section 20. The level difference between adjacent pixels that is necessary in color mixing correction can accordingly be prevented from being lost, and appropriate color mixing correction can be performed.

Figure 10:
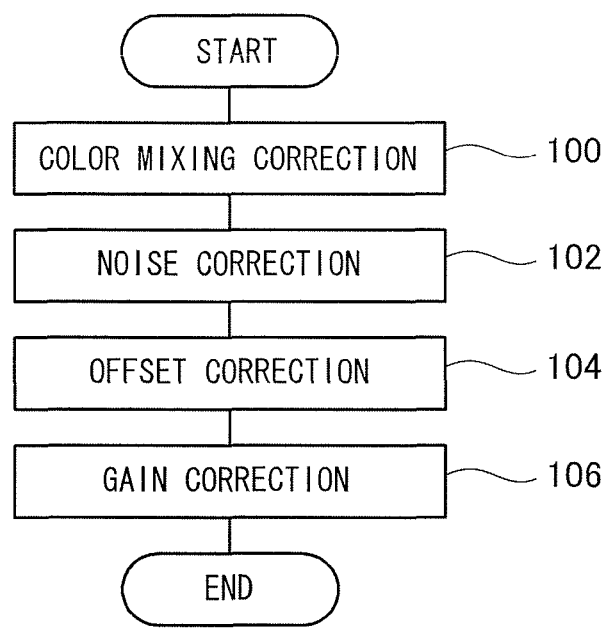
FIG. 10 is a flow chart of processing executed in an image capture correction processing section according to the first exemplary embodiment.

Next, explanation follows regarding processing performed by the image capture correction processing section 16 as operation of the present exemplary embodiment, with reference to the flow chart illustrated in FIG. 10.

First, at step 100, the color mixing correction section 20 reads image data from the image pickup device 14 and performs color mixing correction processing thereon. Namely, the color mixing correction section 20 performs processing to correct the effects of color mixing on pixel data of each pixel by for example multiplying by a coefficient expressing the extent of the effects of color mixing from peripheral pixels.

At step 102, the noise correction section 22 performs noise correction processing on the image data on which the color mixing correction section 20 has performed color mixing correction processing. Namely, the noise correction section 22 performs processing on pixel data of each pixel to remove for example a random noise component.

At step 104, the offset correction section 24 performs offset correction processing on image data on which the noise correction section 22 has performed noise correction processing. Namely, the offset correction section 24 performs processing on pixel data of each pixel to correct a fixed offset component such as a dark current component.

At step 106, the gain correction section 26 performs gain correction processing on image data on which the offset correction section 24 has performed offset correction processing. Namely, the gain correction section 26 performs processing such as sensitivity correction, white balance correction and shading correction on pixel data of each pixel.

The image data on which the gain correction section 26 has performed gain correction processing is output to the image processing section 18. In the image processing section 18, the image data on which gain correction processing has been performed is subject to synchronization processing. Namely, R, G, B pixel data is generated for all of the pixels by interpolating pixel data for colors other than the corresponding color from the pixel data of peripheral pixels for all of the pixels. Note that in the synchronization processing synchronization (interpolation) processing is performed based on a correlation direction determined by the method described above.

As described above, in the present exemplary embodiment the noise correction section 22 is provided at a stage subsequent to the color mixing correction section 20, thereby enabling the level difference between adjacent pixels that is necessary in color mixing correction to be prevented from being lost, and thus enabling appropriate color mixing correction to be performed. This is especially effective since color mixing correction and pixel defect correction processing, for example, are of particular importance due to the fact that compared to a conventional known basic array pattern such as a Bayer array pattern, in the present exemplary embodiment the color filter disposed over the image pickup device includes a greater number of pixels in the basic array pattern, and also includes more patterns of adjacently placed pixels. For example, in a Bayer array there are 4 types of different pixel types in adjacently disposed patterns in the horizontal direction and the vertical direction, namely 2 types of G pixels, and one type each of B and R pixels. There is accordingly a tendency for the effects of color mixing to be uniform, such that a degree of color mixing correction is possible at later stage processing even when the level difference between adjacent pixels has been lost. However more appropriate color mixing correction can be performed since the level difference between adjacent pixels that is necessary in color mixing correction can be prevented from being lost due to making configuration such as in the present exemplary embodiment wherein the noise correction section 22 is provided at a stage subsequent to the color mixing correction section 20. Moreover, since there are a total of 18 types in the case of the respective arrays of FIG. 2 and FIG. 5, there are various effects from color mixing, making processing at a later stage more complex, and making appropriate color mixing correction difficult when the level difference between adjacent pixels has been lost. Preventing the level difference between adjacent pixels that is necessary in color mixing correction from being lost by making configuration wherein the noise correction section 22 is provided at a stage subsequent to the color mixing correction section 20 is thus particularly effective in an imaging apparatus such as in the present exemplary embodiment employing an image pickup device disposed with a color filter with a basic array pattern size of 4×4 or greater, with a large number of pixels contained therein.

Second Exemplary Embodiment

Explanation follows regarding a second exemplary embodiment of the present invention. Note that portions similar to those of the first exemplary embodiment are appended with the same reference numerals, and detailed explanation thereof is omitted.

Figure 11:
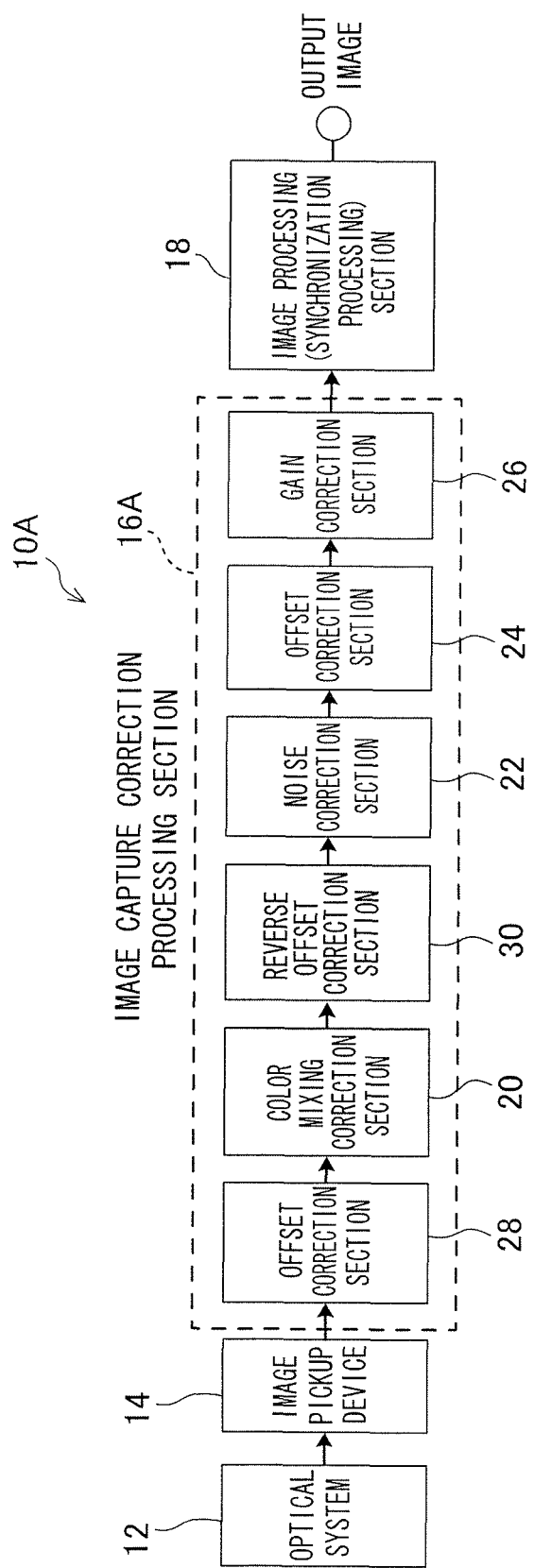
FIG. 11 is a schematic block diagram of an imaging apparatus according to a second exemplary embodiment.

FIG. 11 illustrates an imaging apparatus 10A according to the present exemplary embodiment. As illustrated in FIG. 11, the imaging apparatus 10A differs from the imaging apparatus 10 illustrated in FIG. 1 in the configuration of an image capture correction processing section 16A. Since other configurations are similar to those of the imaging apparatus 10, detailed explanation thereof is omitted.

As illustrated in FIG. 11, the image capture correction processing section 16A differs from the image capture correction processing section 16 illustrated in FIG. 1 in the respect that an offset correction section 28 is provided at an earlier stage than the color mixing correction section 20, and a reverse offset correction section 30 is provided at a stage subsequent to the color mixing correction section 20.

As described above, as gain correction is processing that corrects gain of the pixel itself, gain correction is preferably performed after offset processing, since an offset amount of an image capture signal changes depending on the gain correction amount when gain correction is performed prior to offset correction. As illustrated in FIG. 1 and FIG. 11, configuration is therefore made with the gain correction section 26 provided at a stage subsequent to the offset correction section 24.

A relationship between color mixing correction and offset correction is moreover similar to the relationship between gain correction and offset correction, such that it is preferable to perform color mixing correction after offset correction since the offset amount of the image capture signal changes depending on the color mixing correction when color mixing correction is performed prior to offset correction.

However, as described above, since the relationship between offset correction and noise correction makes it preferable to perform offset correction after noise correction, in the image capture correction processing section 16A of the present exemplary embodiment configuration is made such that offset correction is performed prior to color mixing correction, and reverse offset correction is performed after the color mixing correction.

Namely, the offset correction section 28 performs offset correction processing similarly to the offset correction section 24, and the reverse offset correction section 30 performs reverse offset correction by the offset amount of the offset correction processing performed by the offset correction section 28. For example, when the offset correction section 28 performs processing to subtract an offset amount A from pixel data of each pixel, the reverse offset correction section 30 performs processing to add the offset amount A to the pixel data of each pixel. The color mixing correction section 20 is accordingly able to perform appropriate color mixing correction without being affected by offset.

Note that there can be adverse effects in for example subsequent noise correction processing when clipping to zero is performed on pixel data that has become a value less than zero, namely pixel data that has become a negative value when the offset amount is subtracted from the pixel data of each pixel during offset correction prior to color mixing correction.

Accordingly, when the offset correction section 28 subtracts the offset amount from the pixel data of each pixel, even when the pixel data becomes a negative value, the negative value is not clipped at zero, and the negative value is assigned as it is. The color mixing correction section 20 moreover executes color mixing correction that accommodates negative values.

Figure 12:
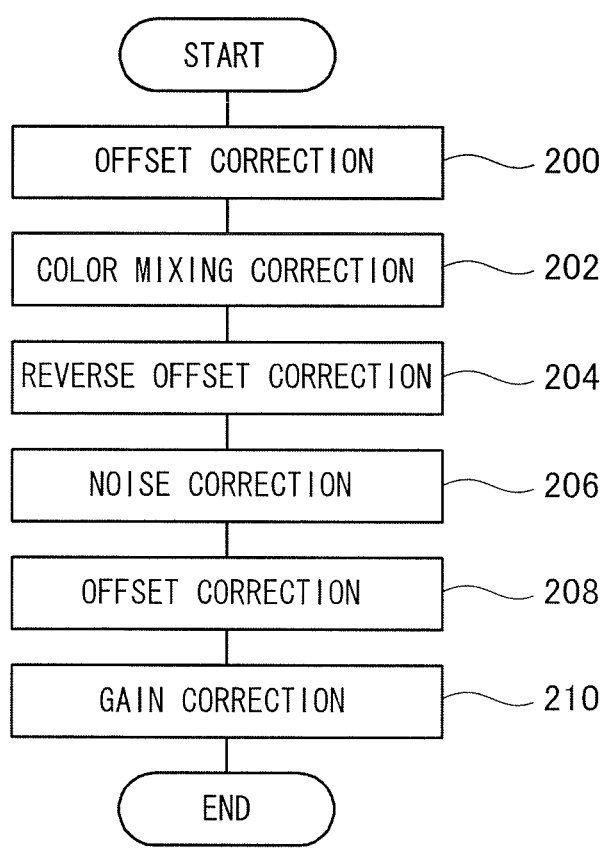
FIG. 12 is a flow chart of processing executed in an image capture correction processing section according to the second exemplary embodiment.

Next, explanation follows regarding processing executed by the image capture correction processing section 16A as operation of the present exemplary embodiment, with reference to the flow chart illustrated in FIG. 12.

First, at step 200, the offset correction section 24 reads image data from the image pickup device 14 and performs offset correction processing thereon. This processing is similar to the processing of step 104 in FIG. 10. Note that even when pixel data becomes a negative value it is not clipped at zero, and the negative value is assigned as it is.

At step 202, the color mixing correction section 20 performs color mixing correction processing on the image data on which the offset correction section 28 has performed offset correction processing. This processing is similar to the processing of step 100 in FIG. 10.

At step 204, the reverse offset correction section 30 performs reverse offset correction processing on the image data on which the color mixing correction section 20 has performed color mixing correction processing. Namely, when at step 200 processing has been performed to subtract the offset amount A from the pixel data of each pixel, at step 204 processing is performed to add the offset amount A to the pixel data of each pixel.

At step 206, the noise correction section 22 performs noise correction processing on the image data on which the reverse offset correction section 30 has performed reverse offset correction processing. This processing is similar to the processing of step 102 in FIG. 10.

At step 208, the offset correction section 24 performs offset correction processing on the image data on which the noise correction section 22 has performed noise correction processing. This processing is similar to the processing of step 200.

At step 210, the gain correction section 26 performs gain correction processing on the image data on which the offset correction section 24 has performed offset correction processing. This processing is similar to the processing of step 106 in FIG. 10.

The image data on which the gain correction section 26 has performed gain correction processing is output to the image processing section 18. Synchronization processing is performed on the gain corrected image data in the image processing section 18.

As described above, in the present exemplary embodiment offset correction is performed prior to color mixing correction, and reverse offset correction is performed after color mixing correction, thereby enabling appropriate color mixing correction to be performed without being affected by offset.

Third Exemplary Embodiment

Next, explanation follows regarding a third exemplary embodiment of the present invention. Note that portions similar to those of the first exemplary embodiment are allocated the same reference numerals, and detailed explanation thereof is omitted.

Figure 13:
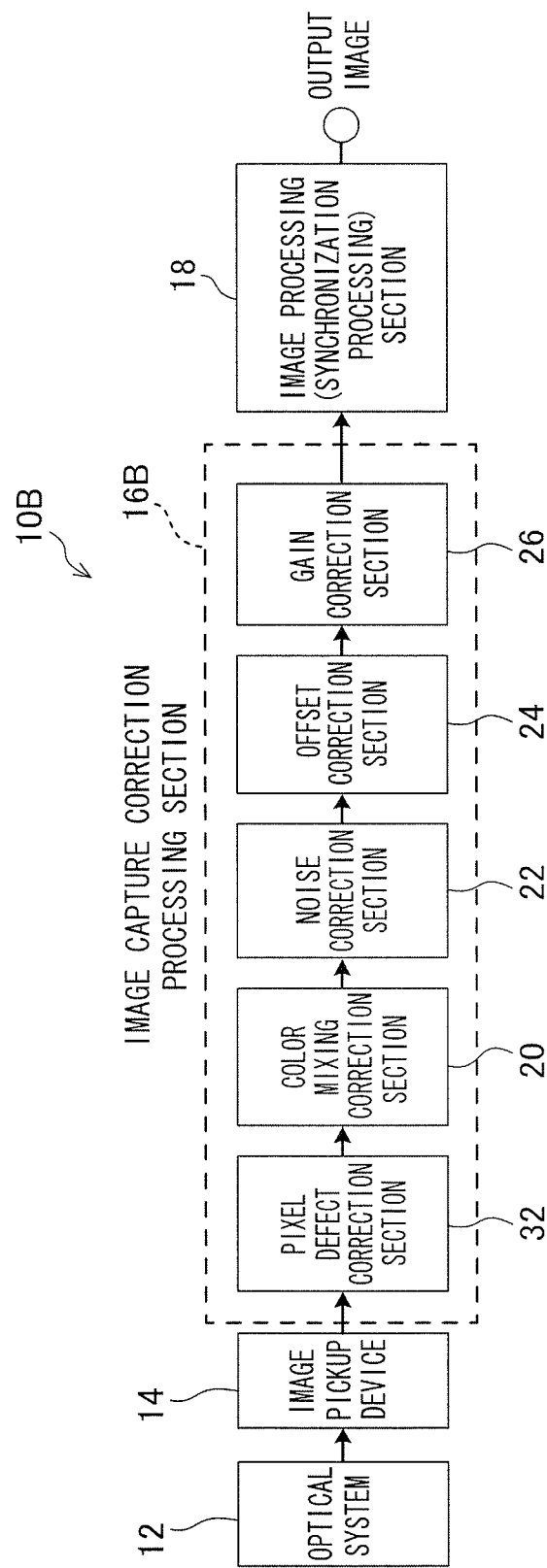
FIG. 13 is a schematic block diagram of an imaging apparatus according to a third exemplary embodiment.

FIG. 13 illustrates an imaging apparatus 10B according to the present exemplary embodiment. As illustrated in FIG. 13, the imaging apparatus 10B differs from the imaging apparatus 10 illustrated in FIG. 1 in the configuration of an image capture correction processing section 16B. Other configurations are similar to those of the imaging apparatus 10, and so detailed explanation thereof is omitted.

As illustrated in FIG. 13, the image capture correction processing section 16B differs from the image capture correction processing section 16 illustrated in FIG. 1 in the respect that a pixel defect correction section 32 is provided at an earlier stage than the color mixing correction section 20.

There is a concern of a drop in image quality when color mixing correction is performed in a state with pixel defects such as scratches present in the pixels of the image pickup device. It is therefore preferable to perform pixel defect correction prior to color mixing correction. The image capture correction processing section 16B of the present exemplary embodiment is accordingly configured such that pixel defect correction is performed prior to color mixing correction.

Figure 14:
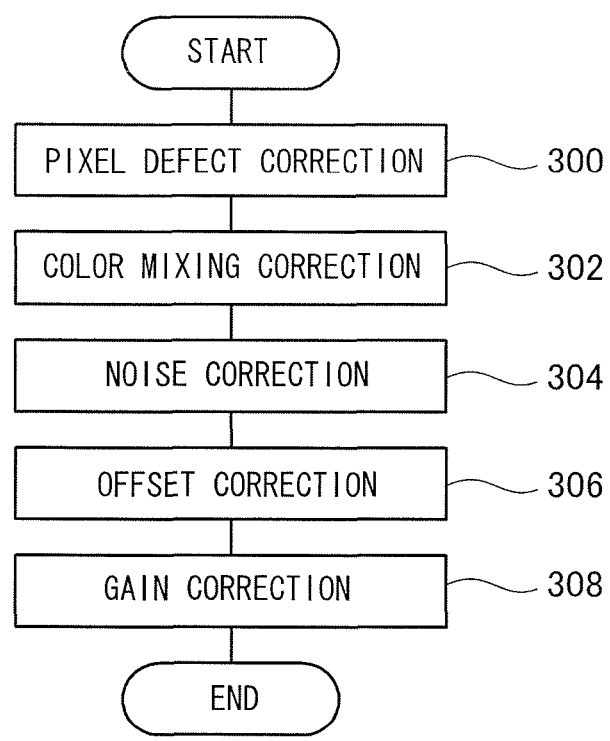
FIG. 14 is a flow chart of processing executed in an image capture correction processing section according to the third exemplary embodiment.

Next, explanation follows regarding processing executed by the image capture correction processing section 16B as operation of the present exemplary embodiment, with reference to the flow chart illustrated in FIG. 14.

First, at step 300 the pixel defect correction section 32 reads image data from the image pickup device 14 and performs pixel defect correction processing thereon. This pixel defect correction processing is processing to interpolate and derive pixel data for a defective pixel from the pixel data of pixels peripheral thereto. Various known methods may be employed.

At step 302, the color mixing correction section 20 performs color mixing correction processing on the image data on which the pixel defect correction section 32 has performed pixel defect correction processing. This processing is similar to the processing of step 100 in FIG. 10.

At step 304, the noise correction section 22 performs noise correction processing on the image data on which the color mixing correction section 20 has performed color mixing correction. This processing is similar to the processing of step 102 in FIG. 10.

At step 306, the offset correction section 24 performs offset correction processing on the image data on which the noise correction section 22 has performed noise correction processing. This processing is similar to the processing of step 104 in FIG. 10.

At step 308, the gain correction section 26 performs gain correction processing on the image data on which the offset correction section 24 has performed offset correction processing. This processing is similar to the processing of step 106 in FIG. 10.

The image data on which the gain correction section 26 has performed gain correction processing is output to the image processing section 18. Synchronization processing is performed on the gain corrected image data in the image processing section 18.

As described above, in the present exemplary embodiment pixel defect correction is performed prior to color mixing correction, thereby enabling appropriate color mixing correction to be performed in a state in which pixel defects have been corrected. A drop in image quality can accordingly be prevented.

Figure 15:
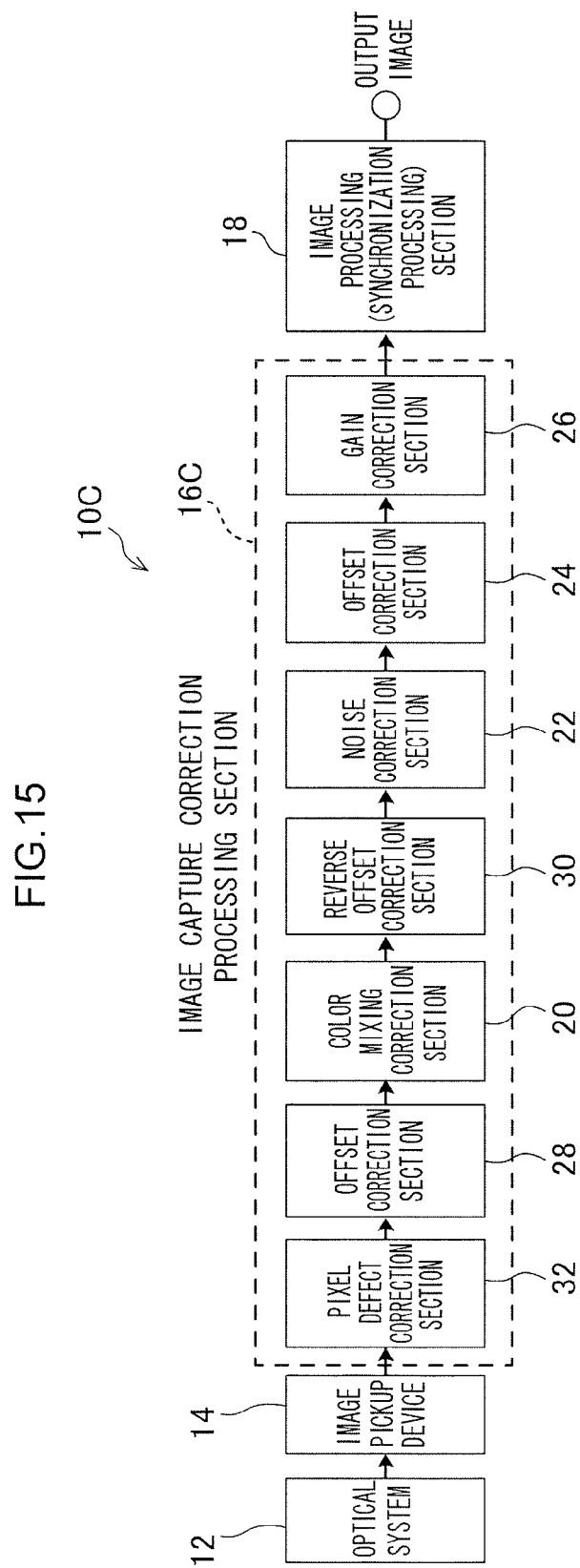
FIG. 15 is a schematic block diagram illustrating a modified example of an imaging apparatus according to the third exemplary embodiment.

Note that configuration may be made wherein the pixel defect correction section 32 is provided at an earlier stage than the offset correction section 28 of the image capture correction processing section 16A of the imaging apparatus 10A described in the second exemplary embodiment, such as in an image capture correction processing section 16C of an imaging apparatus 10C illustrated in FIG. 15.

Moreover, configuration may be made wherein the image capture correction processing section 16, 16A, 16B includes a computer including for example a CPU, ROM, RAM and non-volatile ROM. In such cases, a processing program of the processing explained with the flow charts for each of the above exemplary embodiments may be stored in advance on the non-volatile ROM, and read into and executed by the CPU.

Fourth Exemplary Embodiment

Explanation follows regarding a fourth exemplary embodiment of the present invention. In the present exemplary embodiment, detailed explanation is given regarding the color filter illustrated in FIG. 5 as an example of a modified example of a color filter.

FIG. 5 illustrates a color filter according to the present exemplary embodiment. As illustrated in FIG. 5, the color filter of the present exemplary embodiment includes a basic array pattern P (the pattern indicated by the bold frame) formed from a square array pattern corresponding to 6×6 pixels, with the basic array pattern P disposed so as to repeat in the horizontal direction and the vertical direction. Namely, the color filter is arrayed such that the respective filters of each color R, G, B (the R filters, G filters, B filters) have a specific periodicity.

Moreover, similarly to in the first exemplary embodiment, in the basic array pattern P configuring the color filter array one or more of the filters of each color R, G, B are placed in each line in both the horizontal direction and the vertical direction in the basic array pattern.

The G filters that correspond to brightness system pixels are placed inside the basic array pattern P such that the basic array pattern P contains portions where there are 2 or more of the G filters adjacent to each other in each of the horizontal direction, the vertical direction and the diagonal directions (NE, NW).

Figure 16:
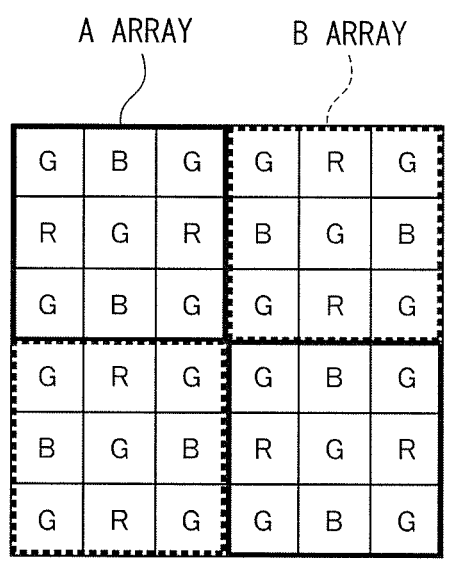
FIG. 16 is a diagram illustrating a basic array pattern contained in a color filter according to a fourth exemplary embodiment.

FIG. 16 illustrates the basic array pattern P illustrated in FIG. 5 in a state split into 4 groups of 3×3 pixels.

As illustrated in FIG. 16, the basic array pattern P may also be considered an array in which an A array of the 3×3 pixels surrounded by the solid line frame and a B array of the 3×3 pixels surrounded by the broken line frame are arranged alternately along the horizontal direction and the vertical direction.

In both the A array and the B array, the G filters that are brightness system pixels are placed at the 4 corners and at the center, thus being placed over both diagonal lines. In the A array, R filters are placed on both sides of the central G filter in the horizontal direction, and B filters are placed on both sides of the central G filter in the vertical direction. However in the B array, B filters are placed on both sides of the central G filter in the horizontal direction, and R filters are placed on both sides of the central G filter in the vertical direction. Namely, the A array and the B array have reverse positional relationships for the R filters and the B filters, but have similar placement otherwise.

The 4 corner G filters in the A array and the B array form square array G filters corresponding to 2×2 pixels due to disposing the A array and the B array alternately in the vertical direction and the horizontal direction as illustrated in FIG. 17.

Namely, the color filter array (basic array pattern P) illustrated in FIG. 5 includes square arrays corresponding to 2×2 pixels configured by G filters.

Figure 18:
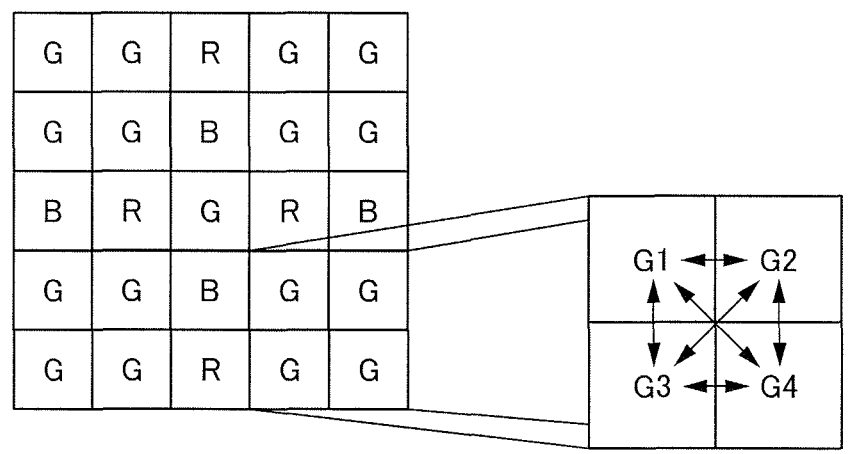
FIG. 18 is a diagram illustrating a distinctive placement of G pixels in a color filter according to the fourth exemplary embodiment.

When, as illustrated in FIG. 17, in a mosaic image output from the image pickup device 14, a 5×5 pixel local region centered on the A array is considered in isolation, the 2×2 G pixels at the 4 corners in the local region are disposed as illustrated in FIG. 18.

As illustrated in FIG. 18, taking the pixel values of the 2×2 G pixels as G1, G2, G3, G4 in sequence from top left to bottom right, the vertical direction difference absolute value of the pixel values of these G pixels is (|G1−G3|+|G2−G4|)/2, and the horizontal direction difference absolute value is (|G1−G2|+|G3−G4|)/2, the difference absolute value in the bottom left to top right diagonal direction is |G2−G3|, and the difference absolute value in the top left to bottom right diagonal direction is |G1−G4|.

The correlation (correlation direction) can then be determined as the direction with the smallest difference absolute value out of these four correlation absolute values.

As illustrated in FIG. 17 and FIG. 18, when the 5×5 pixel local region of a mosaic image with the 3×3 pixel A array positioned at its center is considered in isolation, there are 2×2 G pixels placed at the 4 corners of the 5×5 pixel local region. Consequently, when the 3×3 pixels of the A array inside the above local region are pixels subject to synchronization processing, the sums (or the average values) of the correlation absolute values of the 4 corners are derived separately for each direction, and the direction having the smallest value out of the sums (or the average values) of the correlation absolute values for each direction is determined as the brightness correlation direction of the pixels subject to synchronization processing.

Moreover, the basic array pattern P configuring the color filter array illustrated in FIG. 5 has point symmetry about the center of the basic array pattern (the center of the 4 G filters). As illustrated in FIG. 16, the A array and the B array inside the basic array pattern also respectively have point symmetry about the central G filters, as well as having top-bottom and left-right symmetry (line symmetry).

The color filter of the fourth exemplary embodiment accordingly has similar features to the features (1), (2), (3) and (4) of the color filter of the first exemplary embodiment.

Moreover, the color filter of the fourth exemplary embodiment has the feature that is not present in the color filter of the first exemplary embodiment wherein the G filters are placed in each line in the color filter array diagonal directions (NE, NW), thereby enabling the reproduction precision of synchronization processing to be raised in a high frequency region.

In each of the above exemplary embodiments, explanation has been given regarding a color image pickup device with color filters in the 3 primary colors RGB, however the present invention is not limited thereto. The present invention may also be applied to a 4-color color filter of the 3 primary colors RGB+another color (for example emerald (E)).

Moreover, the present invention may also be applied to an image processing apparatus that processes image data of an image captured by a color image pickup device with a 4-color complementary color filter that has G in addition to C (cyan), M (magenta) and Y (yellow) that are complementary colors of the primary colors RGB.

In each of the above exemplary embodiments, explanation has been given regarding cases in which a color filter with a basic array pattern size larger than that of a Bayer array color filter is employed, however the present invention may also be applied to an imaging apparatus employing a Bayer array color filter.

The present invention is moreover not limited to the exemplary embodiments described above, and obviously various modifications are possible within a range not departing from the spirit of the present invention.

What is claimed is:

1. An imaging apparatus comprising:
    an image pickup device comprising a plurality of photoelectric conversion elements arrayed in a horizontal direction and a vertical direction;
    a color filter that is provided above a plurality of pixels configured by the plurality of photoelectric conversion elements, the color filter having repeatedly disposed basic array patterns of a plurality of filters respectively corresponding to a plurality of different colors that are placed in a predetermined pattern in the horizontal direction and the vertical direction;
    a color mixing correction section that performs color mixing correction on image data of an image captured by the image pickup device; and
    a noise correction section that performs noise correction processing on the image data that has been color mixing corrected by the color mixing correction section,
    wherein:
    in the color filter the basic array pattern is disposed with a first filter corresponding to a first color that contributes most to obtaining a brightness signal and second filters respectively corresponding to 2 or more second colors other than the first color, and the basic array pattern is disposed repeating in the horizontal direction and the vertical direction;
    the first filter is moreover placed such that in the basic array pattern there are portions where there are 2 or more of the first filters adjacent to each other in the horizontal direction, the vertical direction and diagonal directions;
    the color filter has point symmetry about the center of the basic array pattern.

2. The imaging apparatus of claim 1, further comprising:
    an offset correction section that performs offset correction on the image data prior to the color mixing correction; and
    a reverse offset correction section that performs reverse offset correction on the image data after the color mixing correction and prior to the noise correction processing.

3. The imaging apparatus of claim 2, wherein:
    the offset correction section assigns negative values to pixel values that become less than zero when an offset value has been subtracted from each pixel value of the image data.

4. The imaging apparatus of claim 1, further comprising:
    a pixel defect correction section that performs pixel defect correction prior to the color mixing correction.

5. The imaging apparatus of claim 1, wherein:
    the basic array pattern is a square array pattern corresponding to N×N pixels, wherein N is an integer of 4 or above.

6. The imaging apparatus of claim 1, wherein:
    the color filter contains a square array corresponding to 2×2 pixels configured by the first filter.

7. The imaging apparatus of claim 1, wherein:
    the first color is green (G), and the second colors are red (R) and blue (B).

8. The imaging apparatus of claim 7, wherein:
    the color filter includes a R filter, a G filter and a B filter corresponding respectively to the colors red (R), green (G), and blue (B); and
    the color filter is configured by a first array and a second array alternately arrayed in the horizontal direction and the vertical direction, wherein the first array corresponds to 3×3 pixels with the R filter placed at the center, the B filter placed at the 4 corners, and the G filter placed at the top, bottom, left and right of the central R filter, and the second array corresponds to 3×3 pixels with the B filter placed at the center, the R filter placed at the 4 corners, and the G filter placed at the top, bottom, left and right of the central B filter.

9. The imaging apparatus of claim 7, wherein:
    the color filter includes a R filter, a G filter and a B filter corresponding respectively to the colors red (R), green (G), and blue (B); and
    the color filter is configured by a first array and a second array alternately arrayed in the horizontal direction and the vertical direction, wherein the first array corresponds to 3×3 pixels with the G filter placed at the center and at the 4 corners, the B filter placed at the top and bottom of the central G filter, and the R filter placed at the left and right of the central G filter, and the second array corresponds to 3×3 pixels with the G filter placed at the center and at the 4 corners, the R filter placed at the top and bottom of the central G filter, and the B filter placed at the left and right of the central G filter.

10. The imaging apparatus of claim 1, wherein:
    in the color filter, the first filter is respectively placed contiguously in the horizontal direction and the vertical direction on both sides of the filter of any one color out of the second filters.

11. A control method of an imaging apparatus comprising:
    an image pickup device comprising a plurality of photoelectric conversion elements arrayed in a horizontal direction and a vertical direction, and
    a color filter that is provided above a plurality of pixels configured by the plurality of photoelectric conversion elements, the color filter having repeatedly disposed basic array patterns of a plurality of filters respectively corresponding to a plurality of different colors that are placed in a predetermined pattern in the horizontal direction and the vertical direction,
    wherein:
    in the color filter the basic array pattern is disposed with a first filter corresponding to a first color that contributes most to obtaining a brightness signal and second filters respectively corresponding to 2 or more second colors other than the first color, and the basic array pattern is disposed repeating in the horizontal direction and the vertical direction;

the first filter is moreover placed such that in the basic array pattern there are portions where there are 2 or more of the first filters adjacent to each other in the horizontal direction, the vertical direction and diagonal directions;

the color filter has point symmetry about the center of the basic array pattern, the imaging apparatus control method comprising:

performing color mixing correction on image data of an image captured by the image pickup device; and performing noise correction processing on the image data that has been color mixing corrected.

12. A non-transitory storage medium storing an imaging apparatus control program that causes a computer that controls an imaging apparatus comprising:

an image pickup device comprising a plurality of photoelectric conversion elements arrayed in a horizontal direction and a vertical direction, and a color filter that is provided above a plurality of pixels configured by the plurality of photoelectric conversion elements, the color filter having repeatedly disposed basic array patterns of a plurality of filters respectively corresponding to a plurality of different colors that are placed in a predetermined pattern in the horizontal direction and the vertical direction, to function as:

a color mixing correction section that performs color mixing correction on image data of an image captured by the image pickup device; and a noise correction section that performs noise correction processing on the image data that has been color mixing corrected by the color mixing correction section, wherein:

in the color filter the basic array pattern is disposed with a first filter corresponding to a first color that contributes most to obtaining a brightness signal and second filters respectively corresponding to 2 or more second colors other than the first color, and the basic array pattern is disposed repeating in the horizontal direction and the vertical direction;

the first filter is moreover placed such that in the basic array pattern there are portions where there are 2 or more of the first filters adjacent to each other in the horizontal direction, the vertical direction and diagonal directions;

the color filter has point symmetry about the center of the basic array pattern.

13. The imaging apparatus of claim 1, wherein:

one or more of the first filter and one or more of each of the second filters respectively corresponding to the second colors are respectively placed in each horizontal direction line and each vertical direction line inside the basic array pattern.

14. The imaging apparatus of claim 1, further comprising:

a white balance correction section that performs white balance correction after the noise correction processing.

* * * * *